United States Patent [19]
Kanemori et al.

[11] Patent Number: 6,072,559
[45] Date of Patent: Jun. 6, 2000

[54] ACTIVE MATRIX DISPLAY DEVICE HAVING DEFECT REPAIR EXTENSION LINE BENEATH EACH PIXEL

[75] Inventors: Yuzuru Kanemori, Nara; Atsushi Ban, Kyoto; Mikio Katayama, Ikoma, all of Japan

[73] Assignee: Sharp Kabushiki Kaisha, Osaka, Japan

[21] Appl. No.: 08/811,781

[22] Filed: Mar. 6, 1997

[30] Foreign Application Priority Data

Mar. 12, 1996 [JP] Japan .................................. 8-055236

[51] Int. Cl.⁷ ..................................................... G02F 1/13
[52] U.S. Cl. ......................... 349/192; 349/143; 324/770
[58] Field of Search ................................... 349/192, 139, 349/143, 44, 40, 54, 55; 324/770

[56] References Cited

U.S. PATENT DOCUMENTS

| | | |
|---|---|---|
| 4,688,896 | 8/1987 | Castleberry . |
| 4,759,610 | 7/1988 | Yanagisawa . |
| 4,857,907 | 8/1989 | Wakai et al. . |
| 4,923,948 | 5/1990 | Matsuki et al. . |
| 5,003,356 | 3/1991 | Wakai et al. . |
| 5,032,883 | 7/1991 | Wakai et al. . |
| 5,054,887 | 10/1991 | Kato et al. ................................ 349/42 |
| 5,166,085 | 11/1992 | Wakai et al. . |
| 5,335,102 | 8/1994 | Kanemori . |
| 5,585,951 | 12/1996 | Noda et al. .............................. 349/122 |
| 5,641,974 | 6/1997 | den Boer et al. ........................ 257/59 |
| 5,796,448 | 8/1998 | Kim et al. ................................. 349/39 |
| 5,844,199 | 12/1998 | Lino et al. ........................ 219/121.65 |
| 5,852,482 | 12/1998 | Kim ......................................... 349/46 |

FOREIGN PATENT DOCUMENTS

| | | |
|---|---|---|
| 0 465 111 A2 | 1/1992 | European Pat. Off. . |
| 0611812 A2 | 8/1994 | European Pat. Off. . |
| 0632229 A1 | 1/1995 | European Pat. Off. . |
| 58-184929 | 10/1983 | Japan . |
| 61-156025 | 7/1986 | Japan . |
| 62-135810 | 6/1987 | Japan . |
| 135351 | 7/1989 | Japan . |
| 4307521 | 10/1992 | Japan . |
| 474714 | 11/1992 | Japan . |
| 7-326200 | 5/1994 | Japan . |
| 6230422 | 8/1994 | Japan . |
| 7-36043 | 2/1995 | Japan . |
| 7-122719 | 12/1995 | Japan . |

OTHER PUBLICATIONS

Fujita et al, "Colorless Polyimide", vol. 29, No. 1 (Jun. 1991), pp. 20–28.
Sakamoto et al, "27.3' A High–Aperture–Ratio 3–in–Diagonal VGA a–Si Light Valve with Pixel/Data and Pixel/Gate Lines Overlapping", SID 96 Digest, pp. 681–684, 1996.
Kim et al, "4.3: High–Aperture and Failt–Tolerant Pixel Structure for TFT–LCDs", SID 95 Digest, pp. 15–18, 1995.
"Application of a Wide Viewing Angle Technique Essential for a Large–Area Display to Mass Production Panel of TFT Starts", Flat–Panel Display '94, p. 166, 1993.
"Mass Production of CMP is Full–Fledged to be Applied to ASIC and DRAM", Nikkei Microdevices, pp. 50–57, 1994.
Backlight, Flat–Panel Display '94, p. 217, 1993.
Patent Abstracts of Japan, vol.017, No. 428 (P–1588), Aug. 9, 1993 & JP–A–05 088199 (Sanyo Electric Co. Ltd.), Apr. 9, 1993.
Patent Abstracts of Japan, vol. 018, No. 532 (P–1810), Oct. 7, 1994 & JP–A–06 186580 (Seiko Epson Corp.), Jul. 8, 1994.
Patent Abstracts of Japan, vol. 016, No. 218, May 21, 1992 & JP–A–04042214, Feb. 12, 1992.

Primary Examiner—Kenneth Parker
Attorney, Agent, or Firm—Nixon & Vanderhye P.C.

[57] ABSTRACT

The active matrix display device of this invention includes: a substrate and a scanning line running in a first direction formed in a first layer located above the substrate. The display device also includes a signal line running in a second direction formed in a second layer located above the substrate; a switching element connected with the scanning line and the signal line; an insulating film formed above the scanning line, the signal line, and the switching element; and a pixel electrode formed above the insulating film so as to connect with the switching element, wherein the active matrix display device further comprises an extension line connected with an electrode of the switching element, the extension line being formed in the second layer so as not to intersect the signal line.

9 Claims, 20 Drawing Sheets

ACTIVE MATRIX DISPLAY DEVICE HAVING DEFECT REPAIR EXTENSION LINE BENEATH EACH PIXEL

BACKGROUND OF THE INVENTION

1. Field of the Invention

The present invention relates to a display device where display is effected by applying a driving signal to a pixel electrode via a switching element. More specifically, the present invention relates to an active matrix display device where high-density display is effected by arranging pixel electrodes in a matrix.

2. Description of the Related Art

Display devices such as a liquid crystal display device, an EL (electroluminescence) display device, and a plasma display device are conventionally operated by methods where a display pattern is formed on a screen by selecting desired pixels among a plurality of pixels arranged in a matrix. As one of such methods, an active matrix driving method is known.

In the active matrix driving method, pixel electrodes arranged in a matrix are independently driven by controlling switching elements connected to the respective pixel electrodes. Such an active matrix driving method realizes high contrast display and thus has been practically used for displays of liquid crystal TV sets, wordprocessors, computer terminals, and the like. TFTs (thin film transistors), MIM (metal-insulator-metal) elements, MOS transistors, diodes, and the like are generally used as switching elements for selectively driving the pixel electrodes. A voltage applied across each pixel electrode and a counter electrode disposed to face the pixel electrode is switched by use of the corresponding switching element, so as to optically modulate a display medium such as liquid crystal material, EL material, and plasma light emitting material contained between the electrodes. This optical modulation of the display medium is visually recognized as a display pattern.

The pixel electrodes are often formed together with source bus lines or gate bus lines in the same layer. In such cases, the pixel electrodes are arranged not to be in contact with the source bus lines and the gate bus lines.

Japanese Laid-Open Patent Publication No. 61156025 proposes a display device where pixel electrodes and bus lines are formed in different layers with an insulating film formed on the bus lines and under the pixel electrodes. With this configuration, since a larger area of each pixel electrode can be secured, the aperture ratio of the resultant display device improves.

FIG. 19 is a plan view of one pixel of the above-described display device. FIG. 20 is a sectional view taken along line A—A of FIG. 19. A TFT is used as the switching element.

As shown in FIG. 19, gate bus lines 1111a and 1111b and source bus lines 1112a and 1112b run along a pixel portion of the display device. Each of the gate bus lines 1111a and 1111b includes a plurality of projections 1111 (FIG. 20) serving as gate electrodes of the TFTs. As shown in FIG. 20, the gate bus lines 1111a and 1111b having the projections 1111 are formed on a substrate 1110, and an insulating film 1130 is formed thereon. On the insulating film 1130, a semiconductor layer 1131 is provided above each projection 1111 so as to serve as a channel region of the TFT. The source bus lines 1112a and 1112b (FIG. 19) each of which includes a plurality of projections 1114 serving as source electrodes of the TFTs are formed on the insulating film 1130 so that the projections 1114 partially overlap the semiconductor layers 1131 with other semiconductor layers 1132 therebetween. Also, drain electrodes 1115 of the TFTs are formed on the insulating film 1130 by, for example, patterning the same layer as that constituting the source bus lines 1112a and 1112b and the projections 1114 serving as the source electrodes.

As shown in FIG. 20, an insulating film 1133 is formed over the entire substrate 1110 so as to cover the gate bus lines 1111a and 1111b, the source bus lines 1112a and 1112b and the TFTs each including the projection 1111 as the gate electrode, the projection 1114 as the source electrode, the drain electrode 1115 and the semiconductor layers 1131 and 1132. A contact hole 1116 is formed through the insulating film 1133, so that a pixel electrode 1140 can be electrically connected with the drain electrode 1115 via the contact hole 1116. The pixel electrode 1140 is therefore in a separate layer from the gate bus lines 1111a and 1111b and the source bus lines 1112a and 1112b. Accordingly, the pixel electrode 1140 can be formed to overlap the gate bus lines 1111a and 1111b and the source bus lines 1112a and 1112b, thereby improving the aperture ratio of the device, as shown in FIG. 19.

In the fabrication of a display device for high-density display, electrical leakage may occur between the pixel electrode 1140 and the source bus line 1112a or 1112b or between the source bus lines 1112a and 1112b due to insufficient cleaning of a substrate, attachment of dust to the substrate, and the like at the fabrication of the substrate on which switching elements are to be formed. Such leakage may bring about a point defect or a line defect of the resultant display device. High technology is required to fabricate a large-scale display panel including some millions of pixels without bringing about such defects.

Referring to FIGS. 21 and 22, cases of leakage between the adjacent source bus lines 1112a and 1112b (hereinbelow, such leakage is called SS leakage) for some reason will be described. This leakage results in two line defects on the display. If a display panel with these defects is used to complete a display device, the resultant displayed device is found to be defective. This lowers production yield.

In the case where such leakage occurs due to a conductive pattern piece 1121 left unremoved as shown in FIG. 21, a drain electrode 1115 located between the source bus lines 1112a and 1112b is also electrically connected with these source bus lines. As a result, the pixel electrode 1140 can no more hold a required potential. This is exhibited as a point defect. Such a point defect can be located and the leak portion can be cut by laser trimming or the like at a cut portion 1122 shown in FIG. 21, for example, at the stage where the display panel including the defective pixel has been completed. In this way, the SS leakage can be eliminated. Thus, by locating and eliminating SS leakage in a display panel before the display panel is incorporated in a display device, the display panel which once had SS leakage can be used for a product.

In the case where SS leakage occurs due to a conductive pattern piece 1161 left unremoved in the middle of the pixel as shown in FIG. 22, no point defect is exhibited. The leakage occurs only between the source bus lines 1112a and 1112b. Only line defects are therefore recognized when a screen is lighted and displays an image. Repair of this type of leakage is considerably difficult because no point defect as a mark for leakage repair is exhibited. Though it is not impossible to locate a leak portion by scanning along the source bus line 1112a or 1112b with a microscope, it requires an enormous amount of time. Such scanning is therefore impracticable on a practical production line. This type of leakage may occur more significantly when pixel electrodes and source bus lines are formed in different layers with an insulating film therebetween. Especially, this leakage may occur when a transparent conductive film such as an ITO film is used as source bus lines.

SUMMARY OF THE INVENTION

The active matrix display device of this invention includes: a substrate; a scanning line running in a first direction formed in a first layer located above the substrate; a signal line running in a second direction formed in a second layer located above the substrate; a switching element connected with the scanning line and the signal line; an insulating film formed above the scanning line, the signal line, and the switching element; and a pixel electrode formed above the insulating film so as to connect with the switching element, wherein the active matrix display device further includes an extension line connected with an electrode of the switching element, the extension line being formed in the second layer so as not to intersect the signal line.

In one embodiment of the invention, the extension line is connected with the pixel electrode.

In another embodiment of the invention, the extension line is straight and parallel with the signal line.

In still another embodiment of the invention, the extension line extends to a position near an adjacent scanning line which is not connected with the corresponding switching element.

In still another embodiment of the invention, the active matrix display device further includes a bus line formed in the first layer in parallel with the scanning line, wherein a contact hole for connecting the extension line and the pixel electrode is formed in a region where the extension line and the bus line overlap as is viewed in a direction perpendicular to a surface of the substrate.

In still another embodiment of the invention, the extension line and the signal line are made of a same material.

According to another aspect of the invention, a defect repair method for the above active matrix display device is provided. The method includes the steps of: applying a current to the signal line; locating a pixel having a point defect; locating a leak position of the pixel having the point defect; and eliminating a leak at the leak position.

Thus, the invention described herein makes possible the advantages of (1) providing an active matrix display device having pixel electrodes and bus lines formed in different layers where SS leakage can be easily detected, and (2) a defect repair method for easily detecting and repairing SS leakage.

These and other advantages of the present invention will become apparent to those skilled in the art upon reading and understanding the following detailed description with reference to the accompanying figures.

DESCRIPTION OF THE PREFERRED EMBODIMENTS

Example 1

Figure 1:
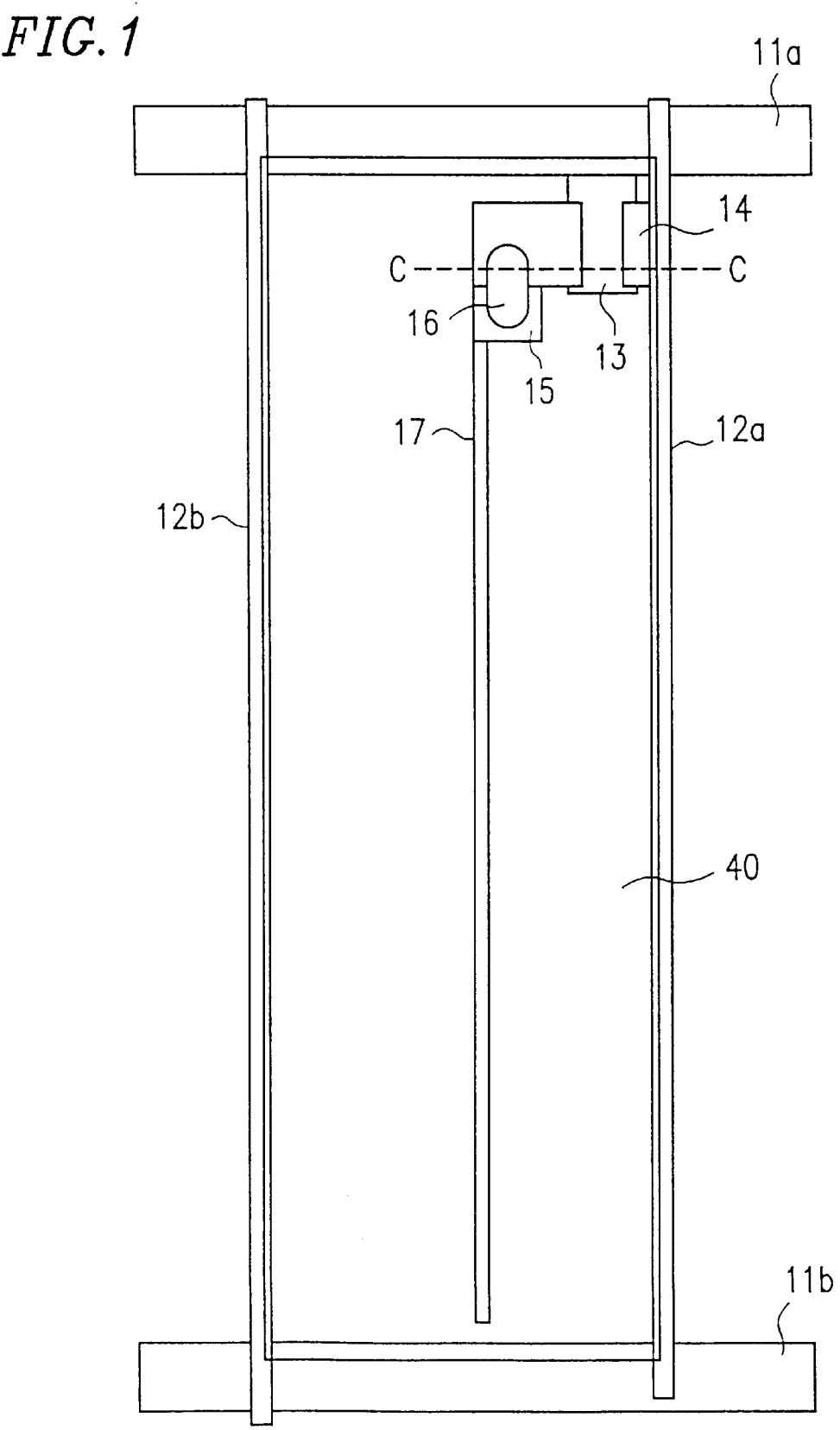
FIG. 1 is a plan view of one pixel of an active matrix display device of Example 1 according to the present invention.
Figure 2:
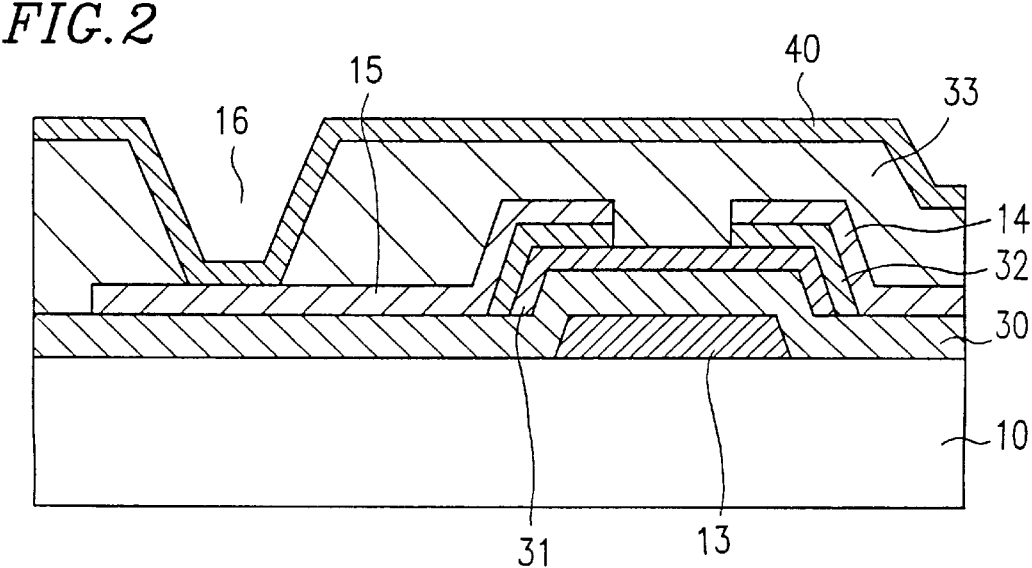
FIG. 2 is a sectional view of a configuration of the active matrix display device of Example 1, taken along line C—C of FIG. 1.
Figure 3:
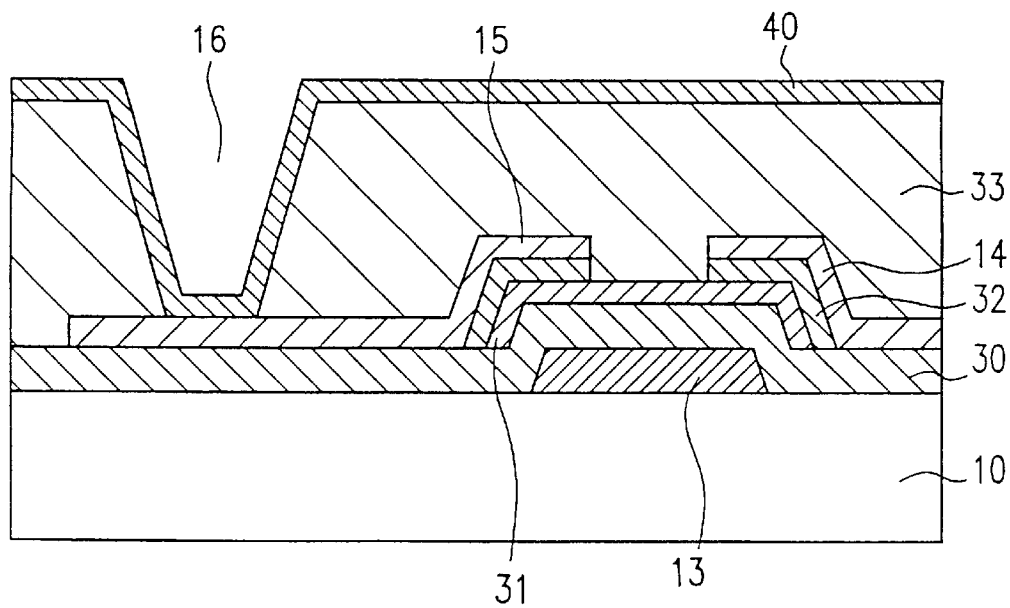
FIG. 3 is a sectional view of another configuration of the active matrix display device of Example 1 where an insulating film is thicker, taken along line C—C of FIG. 1.
Figure 19:
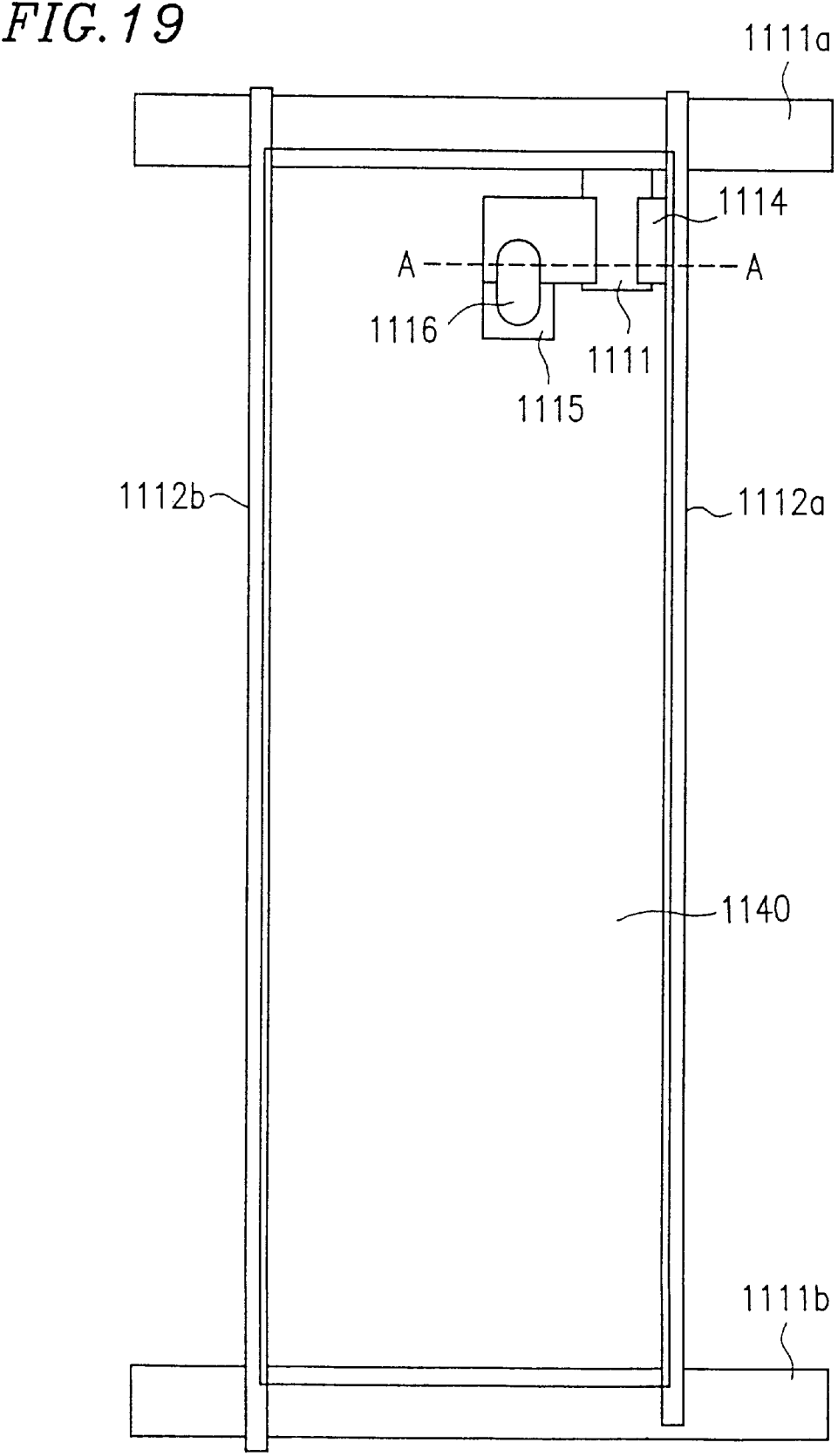
FIG. 19 is a plan view of one pixel of a conventional active matrix display device.
Figure 20:
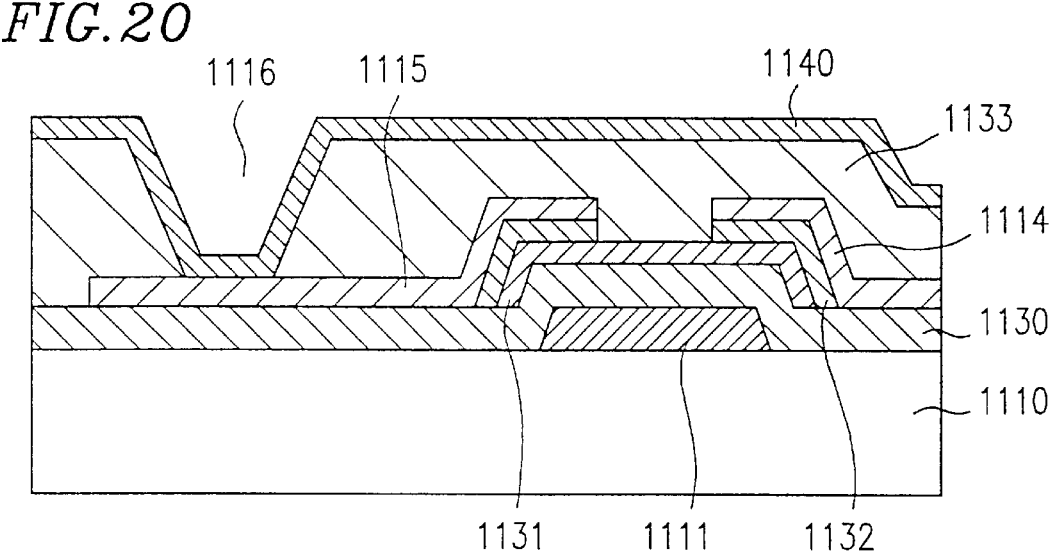
FIG. 20 is a sectional view taken along line A—A of FIG. 19.
Figure 21:
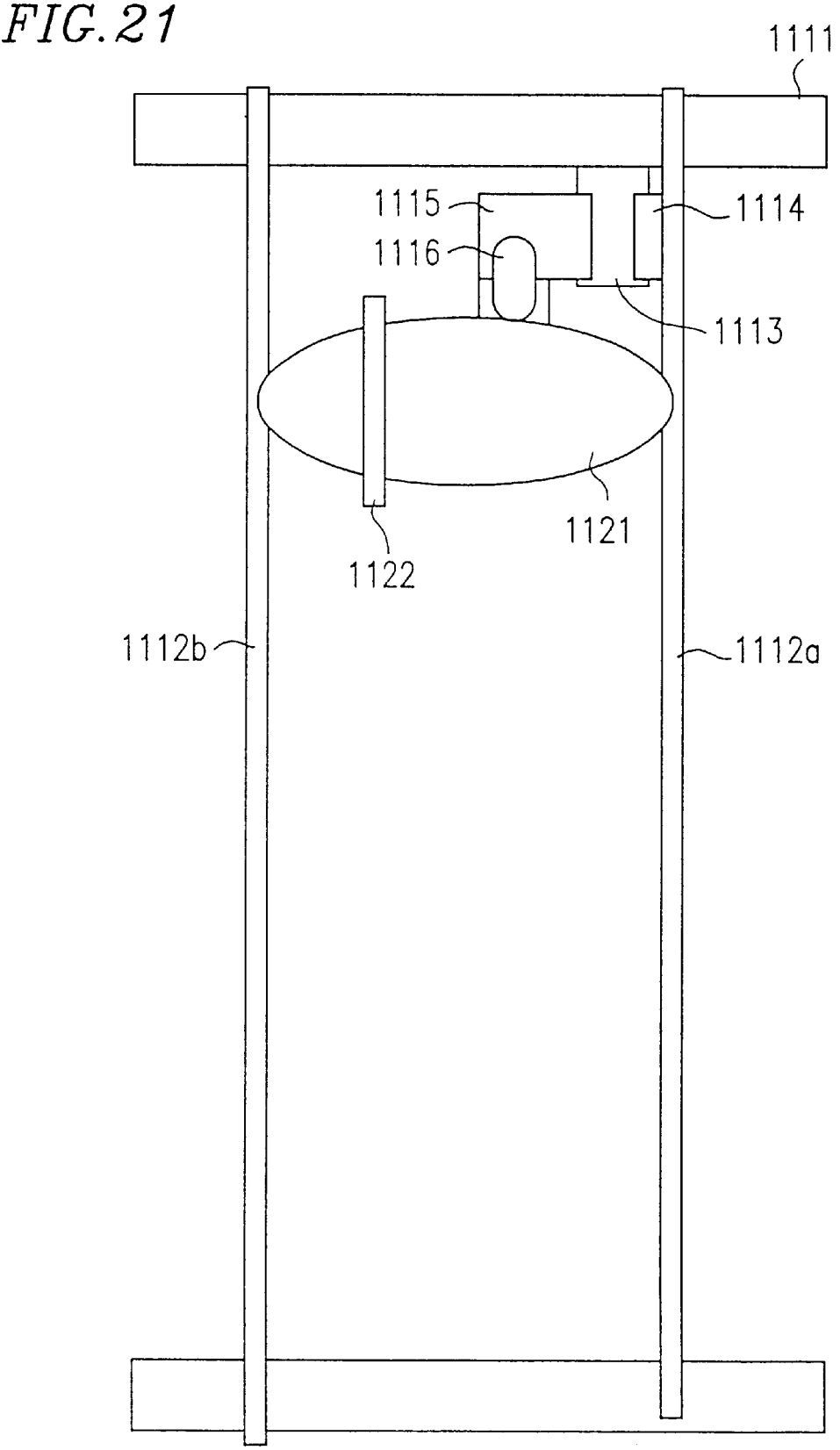
FIG. 21 illustrates an example of an SS leak in the conventional active matrix display device.
Figure 22:
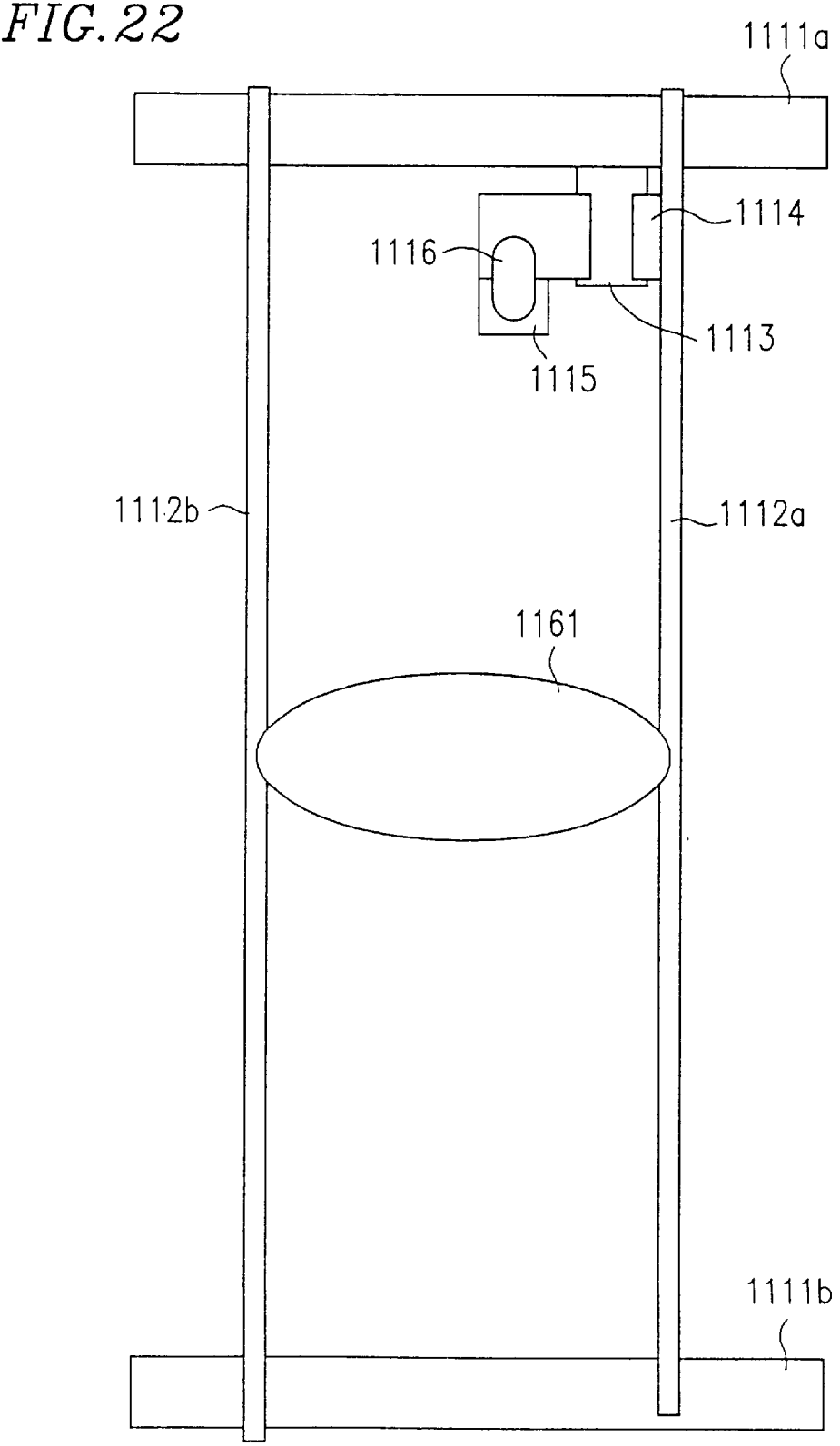
FIG. 22 illustrates another example of an SS leak in the conventional active matrix display device.

FIG. 1 is a plan view of one pixel of an active matrix display device of Example 1 according to the present invention. FIG. 1 shows gate bus lines 11a and 11b, source bus lines 12a and 12b, a TFT 13, and an antenna line 17. The basic configuration of each pixel of the display device according to the present invention is the same as that of the conventional display device shown in FIG. 19, except that the antenna line 17 is provided. FIG. 2 is a sectional view taken along line C—C of FIG. 1. In the case of using a resin such as an acrylic resin for an insulating layer, the insulating layer may be made thicker as compared with other layers by one order of magnitude (e.g., about 3 to 5 μm) as shown in FIG. 3.

Hereinbelow, the fabrication of the active matrix display device of this example will be described.

First, the gate bus lines 11a and 11b are formed on a transparent substrate 10. In this example, a glass substrate was used as the transparent substrate 10, however, it will be appreciated that any suitable substrate may be employed. A conductive material such as Ta, Ti, Al, and Cr is deposited on the glass substrate 10 by sputtering in the form of a single layer or a multilayer, and patterned to form the gate bus lines 11a and 11b. Ta was used in this example. An insulating film made of $Ta_2O_5$ and the like may also be formed simultaneously as a base coat film under the gate bus lines 11a and 11b.

A gate insulating film 30 is then formed over the gate bus lines 11a and 11b. In this example, $SiN_x$ was deposited to a thickness of 3000 Å by plasma CVD to form the gate insulating film 30. A semiconductor layer 31 is then formed by plasma CVD on the gate insulating film 30. In this example, intrinsic amorphous silicon (a-Si(i)) was deposited to a thickness of 1000 Å and patterned. A phosphorus-doped $n^+$-type amorphous silicon layer 32 is then formed and patterned. The layer 32 is formed to improve the ohmic contact between the semiconductor layer 31 and a source electrode 14 or a drain electrode 15 to be formed at a subsequent stage. Microcrystalline silicon may also be used instead of amorphous silicon. In this example, a-Si($n^+$) was deposited to a thickness of 800 Å by plasma CVD and patterned to form the layer 32.

Figure 4:
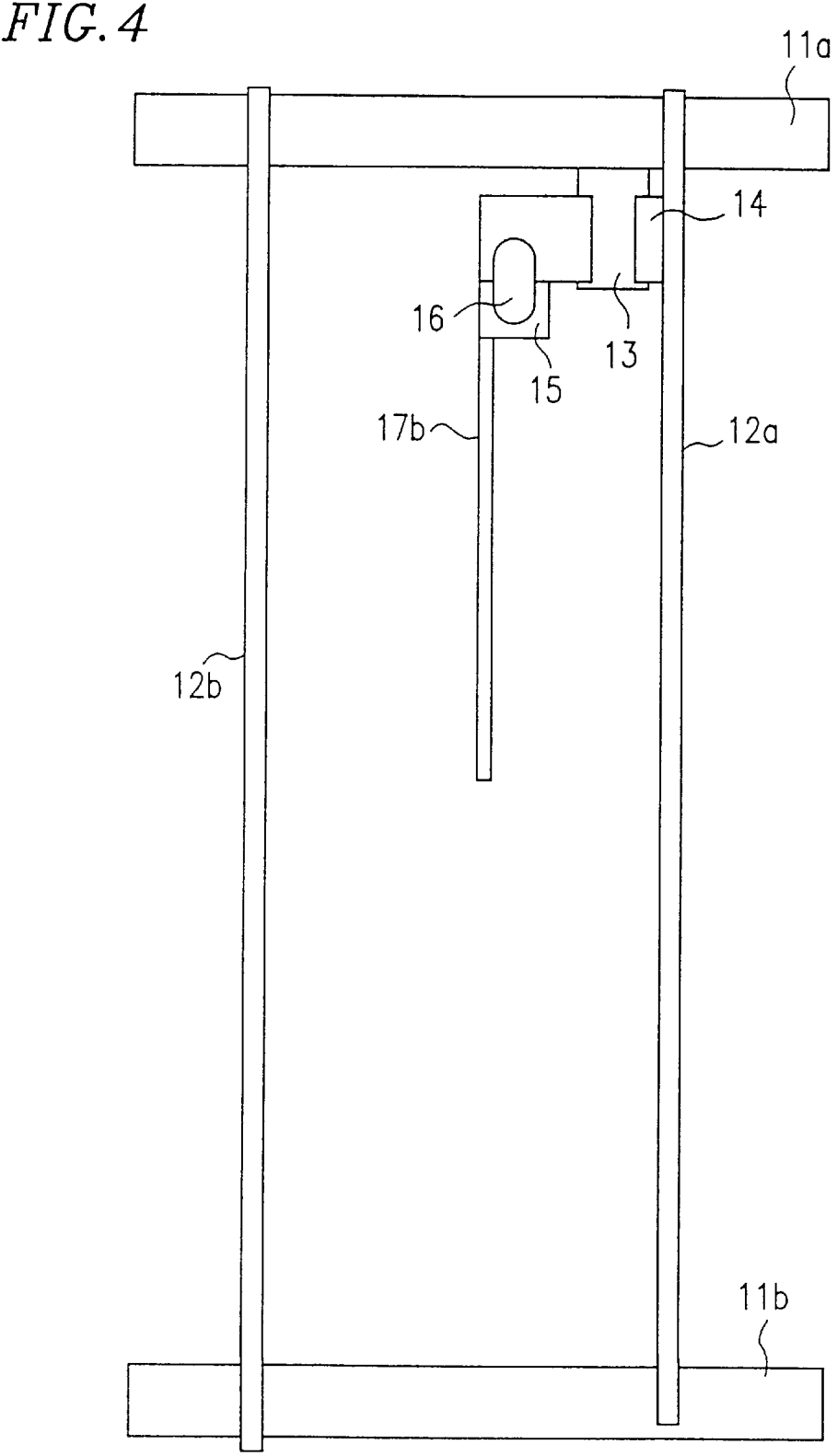
FIG. 4 is a plan view of one pixel of a modified active matrix display device of Example 1 according to the present invention.

Then, a conductive material such as Ta, Ti, Al, Mo, and Cr is deposited by sputtering, and patterned to form the source bus lines 12a and 12b, the source electrode 14 and the drain electrode 15 of the TFT, and the antenna line 17 connected to the drain electrode 15. Ta was used in this example. The antenna line 17 preferably, but not necessarily, extends from the drain electrode 15 to be close to the gate bus line 11b. The length of the antenna line 17 may be determined as required in consideration that the effect of the present invention to be described later is obtained in the region where the antenna line 17 extends. For example, if leakage mostly occurs in the half part of each pixel closer to the gate bus line 11a, an antenna line 17a extending from the drain electrode 15 to the center between the gate bus lines 11a and 11b may be provided as shown in FIG. 4.

The area of the antenna line 17 is not specifically limited, but is preferably as narrow as possible so as not to lower the aperture ratio of the device since the antenna line 17 is substantially not a requisite for display. The narrow antenna line 17 is also preferable because a point defect due to a leak between the narrow antenna line 17 and the source bus line 12a or 12b (between the pixel electrode and the source bus line) occurs less easily. The antenna line 17 may be made narrower than the source bus lines 12a and 12b. A narrow antenna line is more easily disconnected. However, no problem arises on the display even if the antenna line 17 is disconnected, as far as the antenna line 17 of a pixel having SS leakage is not disconnected. Since the probability that a pixel having SS leakage also have a disconnected antenna line is extremely low, the effect of the present invention will not be lost substantially even if some antenna lines 17 are disconnected.

Subsequently, an acrylic resin having photosensitivity is deposited to a thickness of 3.0 μm to form an insulating layer 33. The dielectric constant of the acrylic resin is set at 3.5. An epoxy resin may also be used instead of the acrylic resin. A contact hole 16 is formed through the insulating layer 33 by patterning at a position above the drain electrode 15.

A pixel electrode 40 is then formed by depositing a transparent conductive material and patterning it. In this example, ITO (indium tin oxide) was deposited by sputtering and patterned to form the pixel electrodes 40 arranged in a matrix. Each pixel electrode 40 is electrically connected with the drain electrode 15 via the contact hole 16 and overlaps the gate bus lines 11a and 11b and the source bus lines 12a and 12b, as shown in FIG. 1. Thus, the active matrix substrate as one of the substrates constituting the active matrix liquid crystal display device of the present invention is completed.

Figure 5:
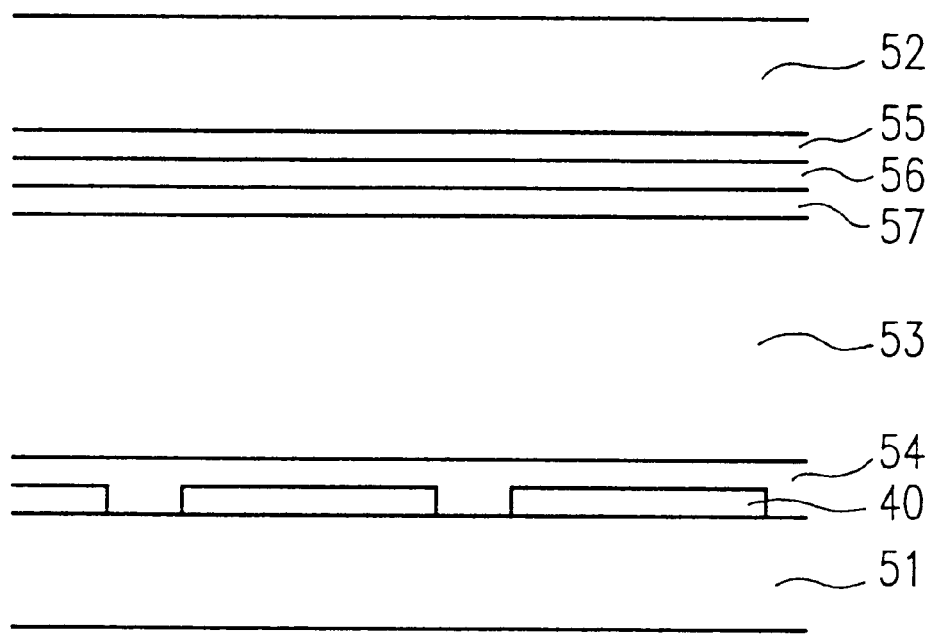
FIG. 5 is a schematic sectional view of the active matrix display device of Example 1 according to the present invention.

FIG. 5 schematically shows the active matrix display device of this example. A display medium 53 is interposed between an active matrix substrate 51 formed in a manner as described above with the pixel electrodes 40 arranged in a matrix thereon and a counter substrate 52 facing the active matrix substrate 51. Color filters 55, a counter electrode 56 made of ITO, and an alignment film 57 are formed on the counter substrate 52. The optical characteristics of the display medium 53 change in response to a driving voltage applied across the pixel electrodes 40 and the counter electrode 56. In this example, a liquid crystal layer was used as the display medium 53. An alignment film 54 for aligning liquid crystal molecules is formed over the pixel electrodes 40.

Figure 6:
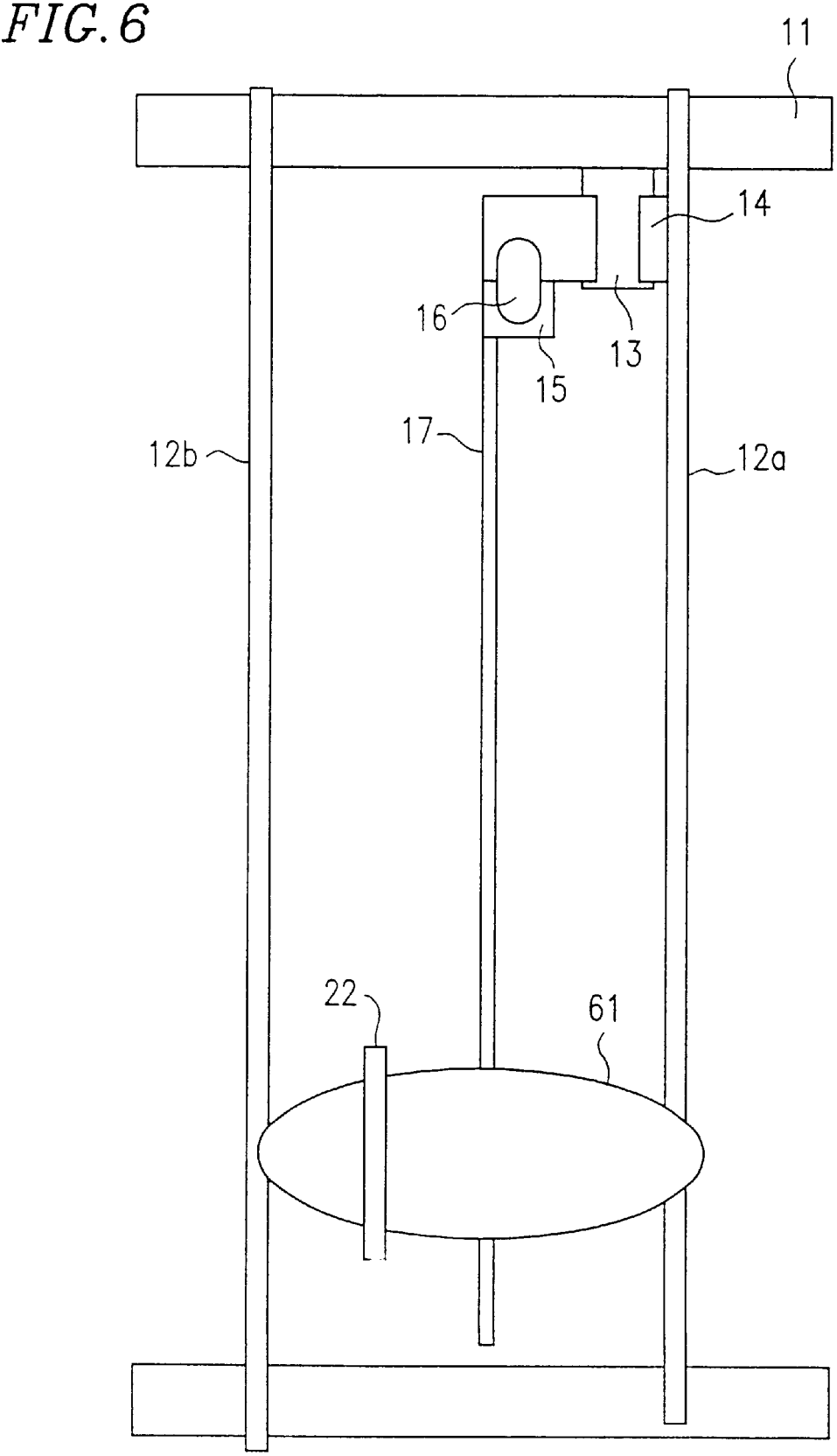
FIG. 6 illustrates the occurrence and repair of a leak in the active matrix display device of Example 1.

Hereinbelow, a method for repairing SS leakage will be described with reference to FIG. 6. When an SS leak in a pixel occurs due to a conductive pattern piece 61 left unremoved between the source bus lines 12a and 12b, the source bus lines 12a and 12b are electrically connected. At this time, however, since the antenna line 17 is provided between the source bus lines 12a and 12b, leakage between the source bus line 12a or 12b and the antenna line 17 also occurs simultaneously. Thus, the pixel electrode 40 is electrically connected with the source bus line 12a or 12b at the position of the SS leak. The pixel having the SS leakage therefore fails to hold the charged potential during the required voltage holding time. When the display device is operated, this pixel is recognized as a point defect. Since the SS leakage is exhibited as two line defects, the pixel having the SS leak can be located by recognizing the point defect present on the two lines, i.e., the source bus lines 12a and 12b.

After the pixel having the SS leak has been located in the above-described manner, the conductive pattern piece 61 where the SS leakage has occurred is irradiated with light such as YAG laser light at an energy of $10^{-9}$ to $10^{-6}$ J/μm². More precisely, a portion 22 is irradiated with laser light to remove the irradiated portion of the conductive pattern piece to electrically isolate the source bus lines 12a and 12b. The portion 22 may be irradiated with laser light from the back side of the active matrix substrate 51 or from the counter substrate 52. In this example, since the color filters 55 made of a resin on the counter substrate 52 makes the shape of the conductive pattern piece 61 less discernible, the irradiation is conducted from the back side of the active matrix substrate 51.

Example 2

Figure 7:
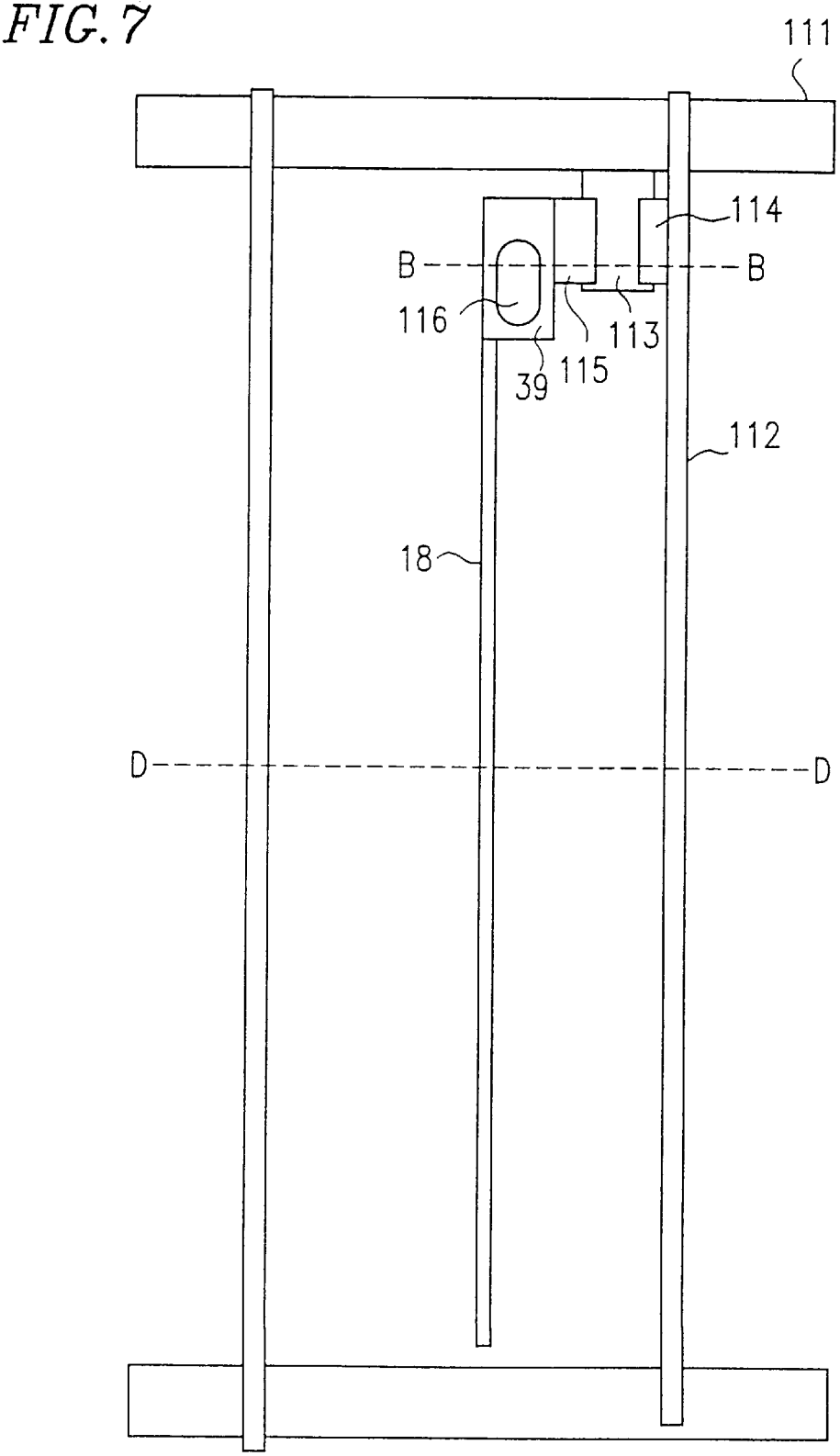
FIG. 7 is a plan view of one pixel of an active matrix display device of Example 2 according to the present invention.
Figure 8:
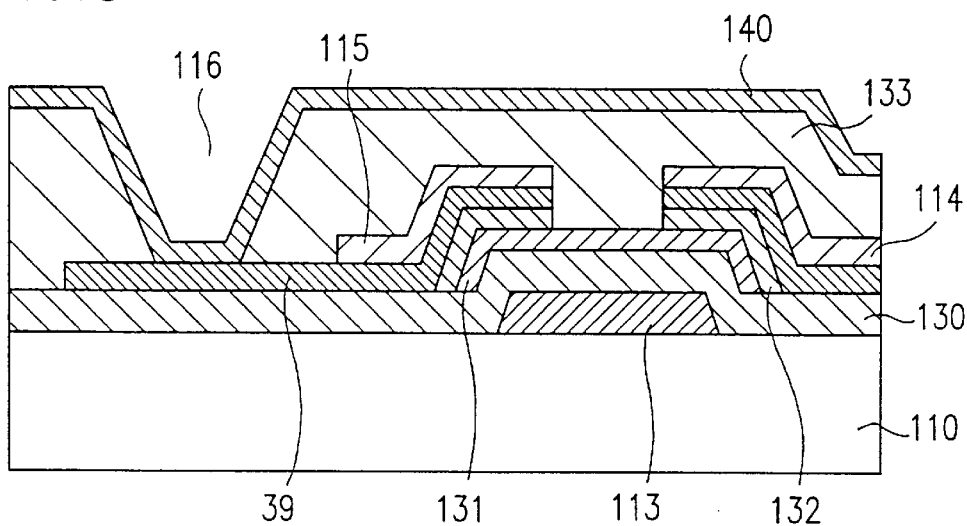
FIG. 8 is a sectional view taken along line B—B of FIG. 7.
Figure 9:
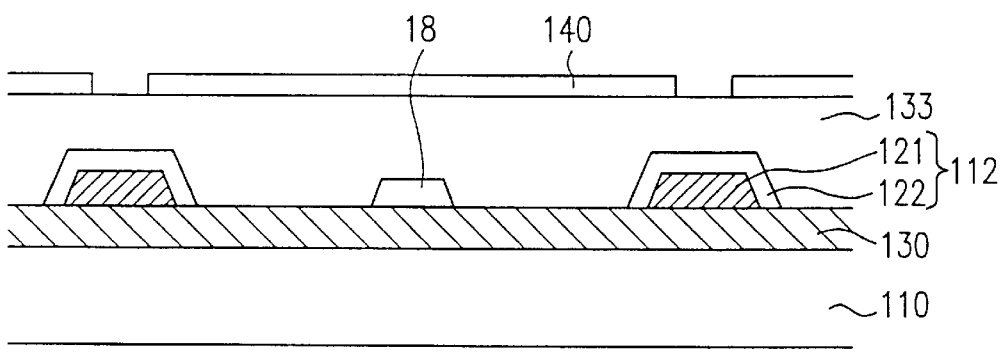
FIG. 9 is a sectional view taken along line D—D of FIG. 7.

FIG. 7 is a plan view of one pixel of an active matrix display device of Example 2 according to the present invention. FIGS. 8 and 9 are sectional views taken along line B—B and line D—D of FIG. 7, respectively.

In Example 1, the contact hole 16 was formed through the insulating layer 33 above the drain electrode 15. In this configuration, however, the size of the contact hole 16 is restricted for the following reason. That is, if a larger contact hole is desired, the drain electrode 15 must be larger. As the drain electrode 15 is larger, the aperture ratio of the device becomes lower.

In order to overcome the above problem, the active matrix display device of this example is fabricated in the following manner. First, a layer of a conductive material is deposited on a substrate 110, such as a glass substrate, and is patterned to form a plurality of gate bus lines 111 which extend in parallel and each of which has a plurality of projections 113 serving as gate electrodes of TFTs. The formation of the gate bus lines 111 having the projections 113 is performed in a similar manner to that described in Example 1. Then, as shown in FIGS. 8 and 9, an insulating film 130 is formed over the entire substrate 110. After the formation of insulating film 130, a semiconductor layer 131, and an n⁺-type amorphous silicon layer 132 are formed on the insulating film 130 in a manner similar to that described in Example 1 so as to be positioned above the projection 113.

Then, a transparent conductive material such as ITO is deposited by sputtering before source bus lines 112 (source and drain electrodes 114 and 115) are formed by depositing a conductive material. The source bus lines 112 (the source and drain electrodes 114 and 115) are then formed by forming a layer of a conductive material such as Ta, Ti, Al, Mo, and Cr and patterning the layer, and thereafter the deposited transparent conductive material is patterned to form a contact portion 39 and an antenna line 18. Since the contact portion 39 and the antenna line 18 are transparent, they do not affect the aperture ratio of the device. In this example, each source bus line 112 is of a double-layer structure composed of a Ta layer 121 and an ITO layer 122, as shown in FIG. 9. With this structure, when the Ta layer 121 is disconnected, the line is kept connected via the ITO layer 122 formed over the Ta layer 121, providing a disconnection redundant structure. Alternatively, the contact portion 39 may be formed above the drain electrode 115 by reversely depositing the materials for the contact portion 39 and the drain electrode 115.

Then, an insulating film 133 is formed over the entire substrate 110 and contact holes 116 are formed through the insulating film 133 so as to reach the respective contact portions 39. Finally, a layer of a transparent conductive material, such as ITO, is formed on the insulating film 133 and then patterned to form pixel electrodes 140 in a matrix, so that the pixel electrodes 140 are in contact with the respective contact portions 39 via the contact holes 116. (In FIG. 7, the pixel electrode 140 is not shown for simplification.) Thus, an active matrix substrate of the present example is obtained.

As described above, in this example, the antenna lines are formed in the respective pixels enclosed by the gate bus lines and the source bus lines as in Example 1. Therefore, the same effects as those obtained in Example 1 are also obtained in this example.

Example 3

Figure 10:
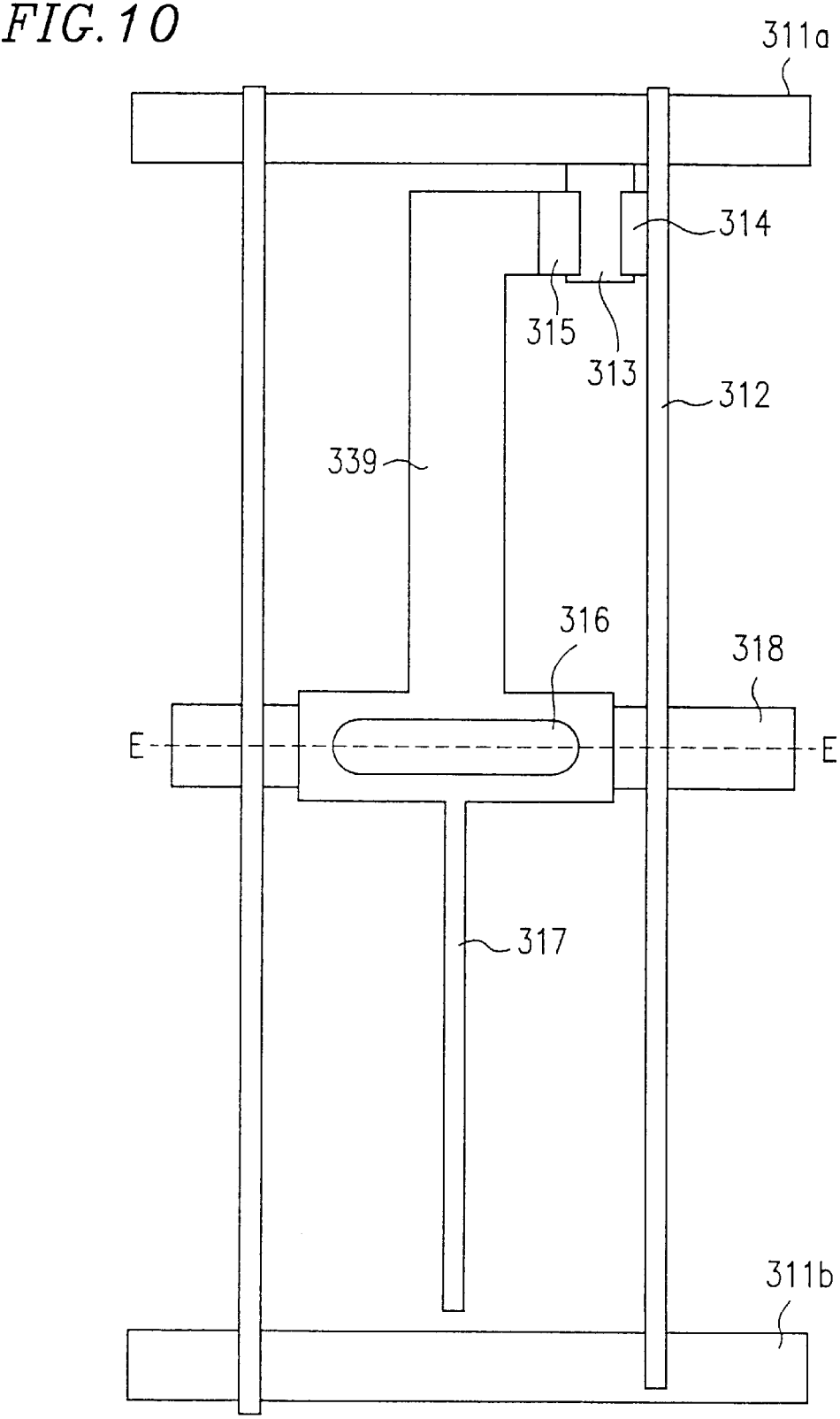
FIG. 10 is a plan view of one pixel of an active matrix display device of Example 3 according to the present invention.
Figure 11:
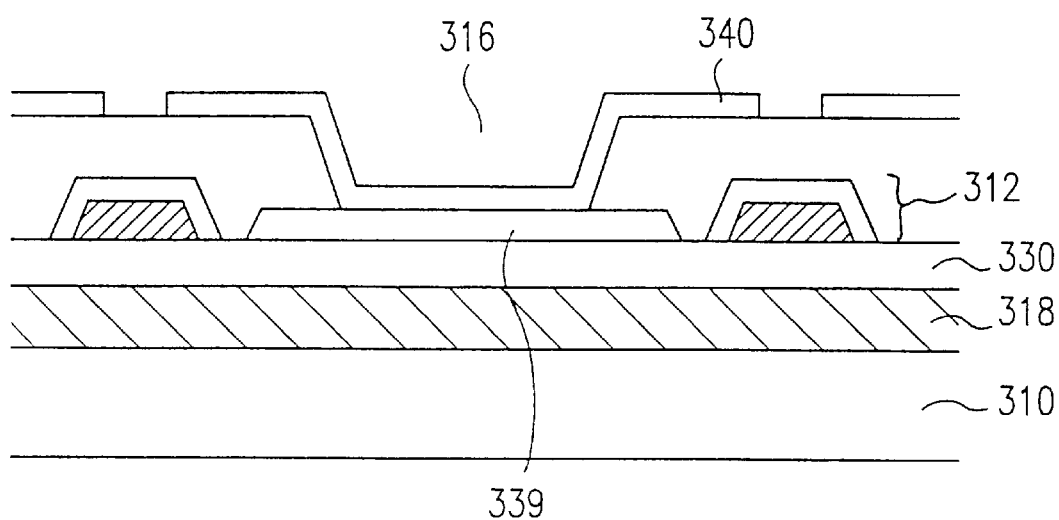
FIG. 11 is a sectional view taken along line E—E of FIG. 10.

FIG. 10 is a plan view of one pixel of an active matrix display device of Example 3 according to the present invention. FIG. 11 is a sectional view taken along line E—E of FIG. 10. In FIG. 10, a pixel electrode is not shown for simplification.

A display device is generally provided with a storage capacitor in parallel with each pixel electrode to improve the charge holding property. In this example, in order to provide such a storage capacitor, a storage capacitor bus line 318 is formed on a substrate 310, such as a glass substrate, by patterning a conductive material simultaneously with the formation of gate bus lines 311a and 311b of the same conductive material in parallel with the gate bus lines 311a and 311b. The potential of the storage capacitor bus line 318 is made equal to that of a counter electrode (not shown) (Cs-on-Common method).

In this example, the gate bus lines 311a and 311b having projections 313 serving as gate electrodes of TFTs, the source bus lines 312 having projections 314 serving as source electrodes of TFTs (not shown), drain electrodes 315, contact portions 339 and antenna lines 317 are formed in a manner similar to that described in Example 1, except for the shape of the contact portions 339. After forming the elements listed above, an insulating film is formed over the entire substrate 310 and a contact hole 316 is formed through the insulating film. The contact hole 316 can be formed above the storage capacitor bus line 318. The size of a contact hole is generally restricted depending on the size of a drain electrode as described above. In the active matrix display device of this example, however, since the contact hole 316 is formed above the storage capacitor bus line 318, it can be made larger, while the size of the drain electrode 315 can be reduced. The storage capacitor in this example is composed of a pixel electrode 340 (FIG. 11), a gate insulating film 330, and the storage capacitor bus line 318. In this example, an antenna line 317 as shown in FIG. 10 is formed.

As described above, in this example, the antenna lines are formed within the respective pixels each enclosed by the gate bus lines and the source bus lines, as in Example 1. Thus, the same effects as those obtained in Example 1 are also obtained in this example.

Figure 12:
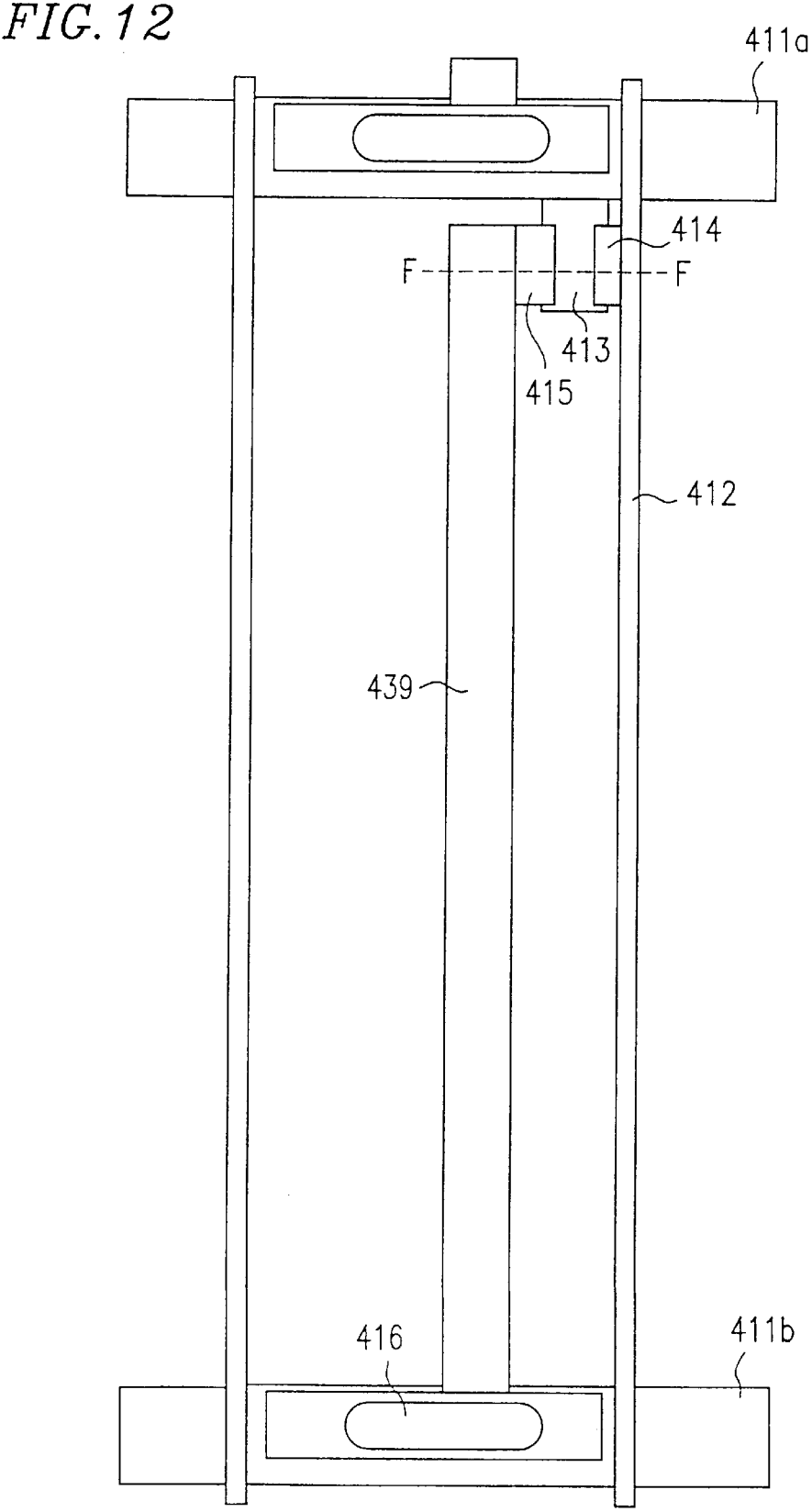
FIG. 12 is a plan view of one pixel of a modified active matrix display device of Example 3 according to the present invention.
Figure 13:
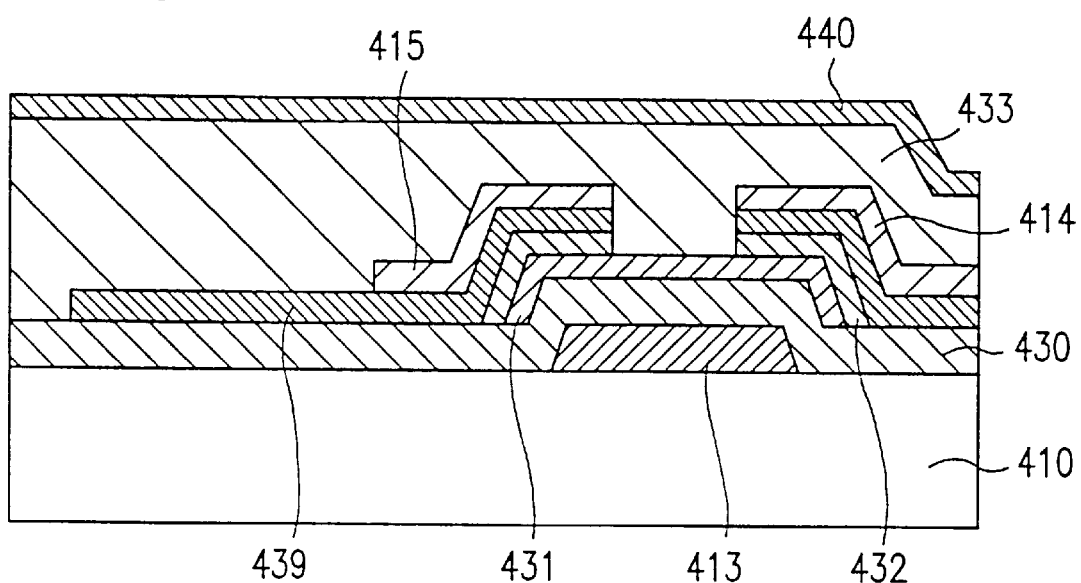
FIG. 13 is a sectional view taken along line F—F of FIG. 12.

FIG. 12 shows a modification of the active matrix display device of this example, where a storage capacitor is formed above an adjacent gate bus line 411b (Cs-on-Gate method). FIG. 13 is a sectional view taken along line F—F of FIG. 12.

In this modified example, an contact portion 439 extends to reach above a gate bus line 411b and serves as an antenna line. The storage capacitor is composed of the gate bus line 411b, a gate insulating film 430 and the contact portion (the antenna line) 439.

Except for the above, the gate bus lines 411a and 411b having projections 413 serving as gate electrodes, source bus lines 412 having projections 414 serving as source electrodes, drain electrodes 415, and semiconductor layers 431 and 432, and the contact portion 439 are formed on a substrate 410, such as a glass substrate, in a similar manner to that described in Example 1. Contact holes 416 are formed through the insulating film 433 to reach the respective contact portions 439. The pixel electrodes 440 arranged in a matrix on the insulating film 433 are connected to the respective contact portions 439 via the contact holes 416. In FIG. 12, the pixel electrode 440 is not shown for simplification.

As described above, in this modified example, the antenna lines are formed in the respective pixels as in Example 1. Thus, the same effects as those obtained in Example 1 are also obtained in this modified example.

Example 4

Figure 14:
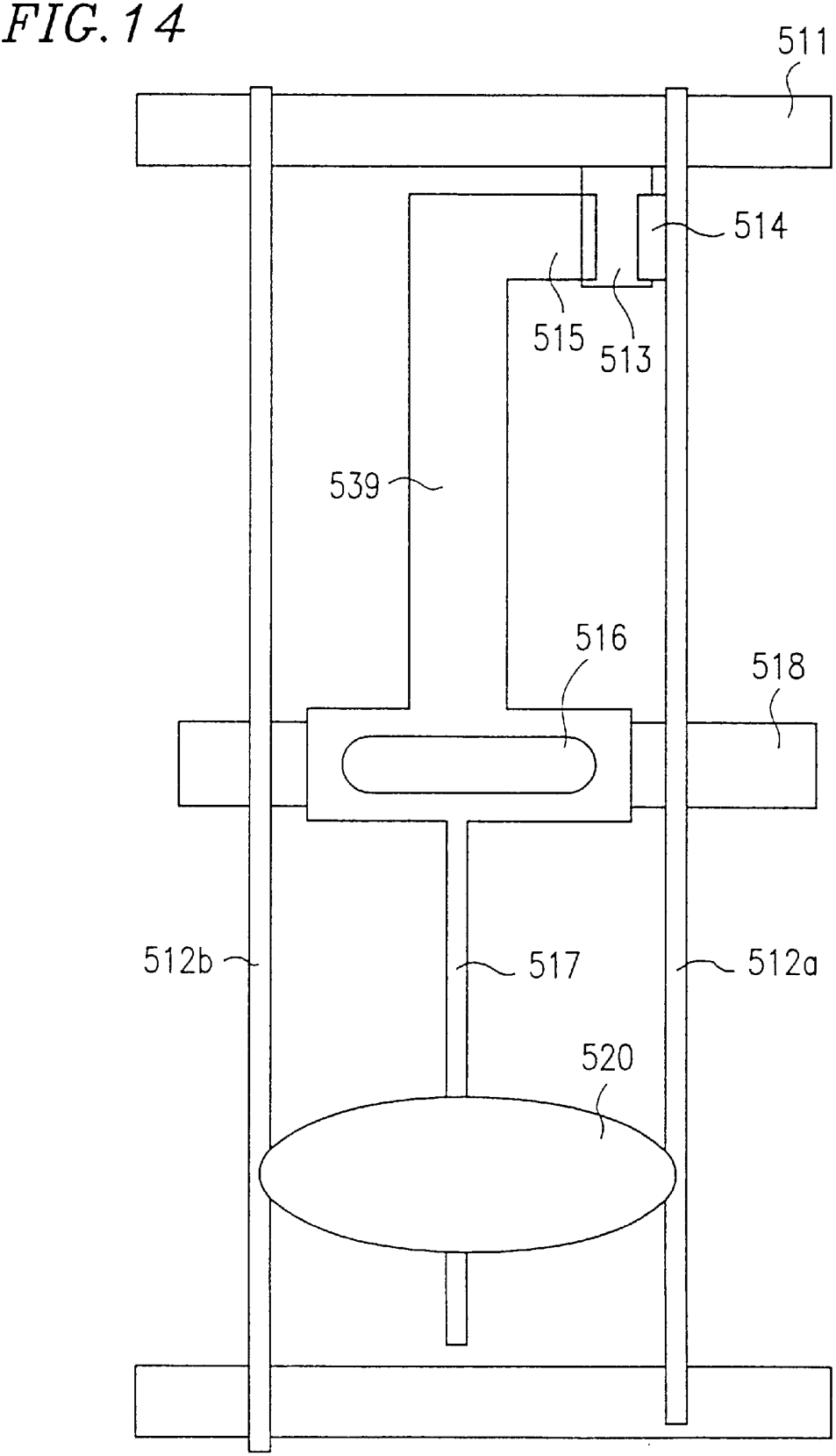
FIG. 14 is a plan view of one pixel of an active matrix display device of Example 4 according to the present invention.

FIG. 14 is a plan view of one pixel of an active matrix display device of Example 4 according to the present invention. The configuration of the active matrix display device of this example is the same as that of Example 3 shown in FIG. 10 except that source bus lines 512a and 512b are formed of a transparent conductive material used for the formation of a contact portion 539. Therefore, gate bus lines 511 having projections 513, storage capacitor bus lines 518, the source bus lines 512a and 512b having projections 514 serving as source electrodes, drain electrodes 515, contact portions 539 and antenna lines 517 are formed in a manner similar to that in Example 3. Thus, due to provision of the antenna lines 517, the same effects as those described in Example 1 are also obtained.

In this example, a conductive pattern piece 520 which brings about leakage between the source bus lines 512a and 512b is also transparent. Accordingly, it is difficult to locate a leakage position with an microscope. This problem can be overcome by using an inspection method according to the present invention described later in Example 7.

Example 5

Figure 15:
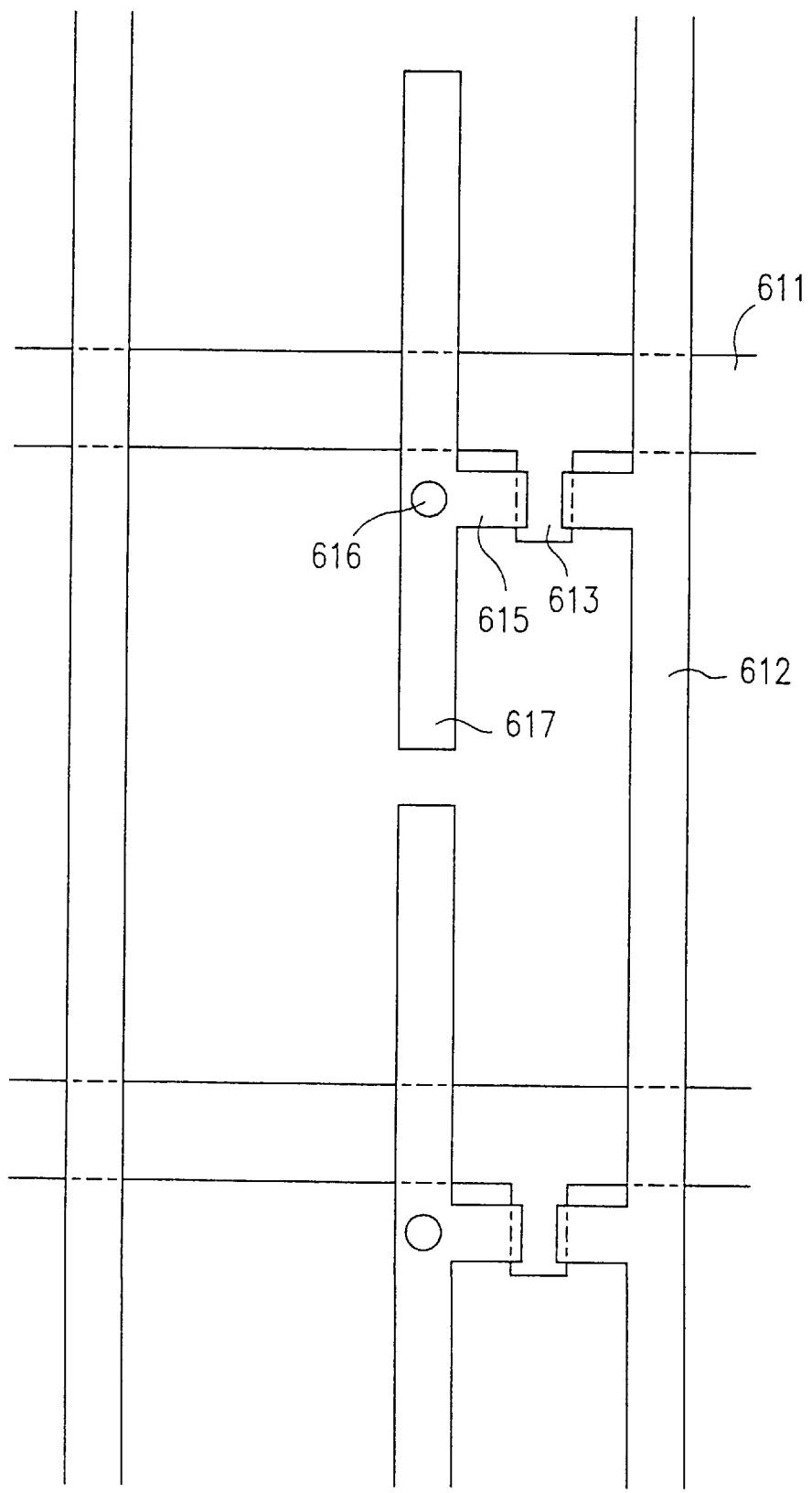
FIG. 15 is a plan view of one pixel of an active matrix display device of Example 5 according to the present invention.

FIG. 15 shows an active matrix display device of Example 5 according to the present invention. In FIG. 15, a pixel electrode is not shown for simplification.

In this example, an antenna line 617 overlies a gate bus line 611 and is formed in the same layer as a source bus line 612. No leakage will occur between the antenna line 617 and the gate bus line 611 since a gate insulating film is formed therebetween. In this example, the antenna line 617 is formed at a position displaced from the center line between the adjacent source bus lines 612 toward the side where a TFT is formed. The reason is that, since SS leakage arises only when a conductive pattern piece, for example, exists across a pixel in the direction along the gate bus line 611 (lateral direction) connecting the adjacent source bus lines 612, the antenna line 617 may be disposed anywhere as far as it is not in contact with the source bus lines 612. The antenna line 617 may not be parallel with the source bus line 612, but may be inclined with respect to the source bus line 612, for example. The antenna line 617 may not be straight, either, but may be curved, for example. Such an antenna line which is not parallel with the source bus line 612 and/or which is not straight can also be used for locating the position of a defect.

Except for the above, the configuration of the active matrix display device is similar to that of Example 1. Thus, the gate bus lines 611 having projections 613 serving as gate electrodes of TFTs, the source bus lines 612 having projections serving as the source electrodes and drain electrodes 615 are formed on a substrate, such as a glass substrate, in a manner similar to that described in Example 1. Accordingly, the same effects as those obtained in Example 1 are also obtained in this example.

Example 6

Figure 16:
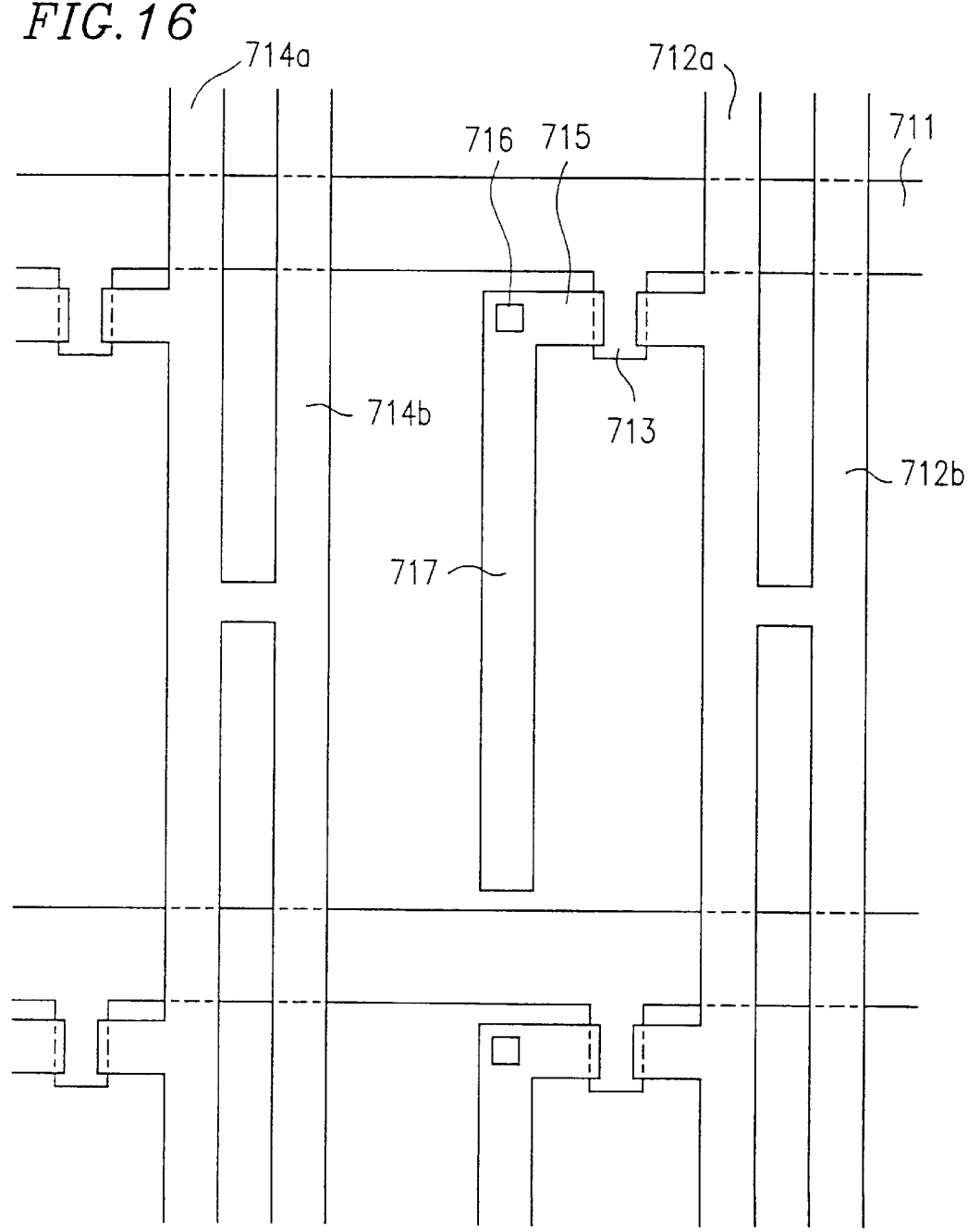
FIG. 16 s a plan view of one pixel of an active matrix display device of Example 6 according to the present invention.

FIG. 16 shows an active matrix display device to of Example 6 according to the present invention. The active matrix display device of this example includes an auxiliary bus line 712b as a disconnection redundant structure of a source bus line, and an antenna line 717. The auxiliary bus line 712b runs parallel with a source bus line 712a and is electrically connected with the source bus line 712a.

With the auxiliary bus line 712b, the function as the source bus line will not be lost even if the source bus line 712a is disconnected. However, with this structure, since the distance between the source bus line 712a and an auxiliary bus line 714b for an adjacent source bus line 714a is smaller, leakage tends to easily occur therebetween. Accordingly, in this example, it is important to repair a defect at an early stage of the fabrication process. In this example, a leak position can be easily located since the antenna line 717 having the effect as described above is formed. Therefore, the tendency of easily bringing about a leak does not cause a problem. The effect of the present invention is therefore more significant by forming the auxiliary bus line.

Except for the above, the configuration of the active matrix display device of the present example is similar to that of Example 1. Thus, the gate bus lines 711 having the projections 713 serving as the gate electrodes, the drain electrodes 715 are formed in a manner similar to that described in Example 1.

Example 7

Figure 17:
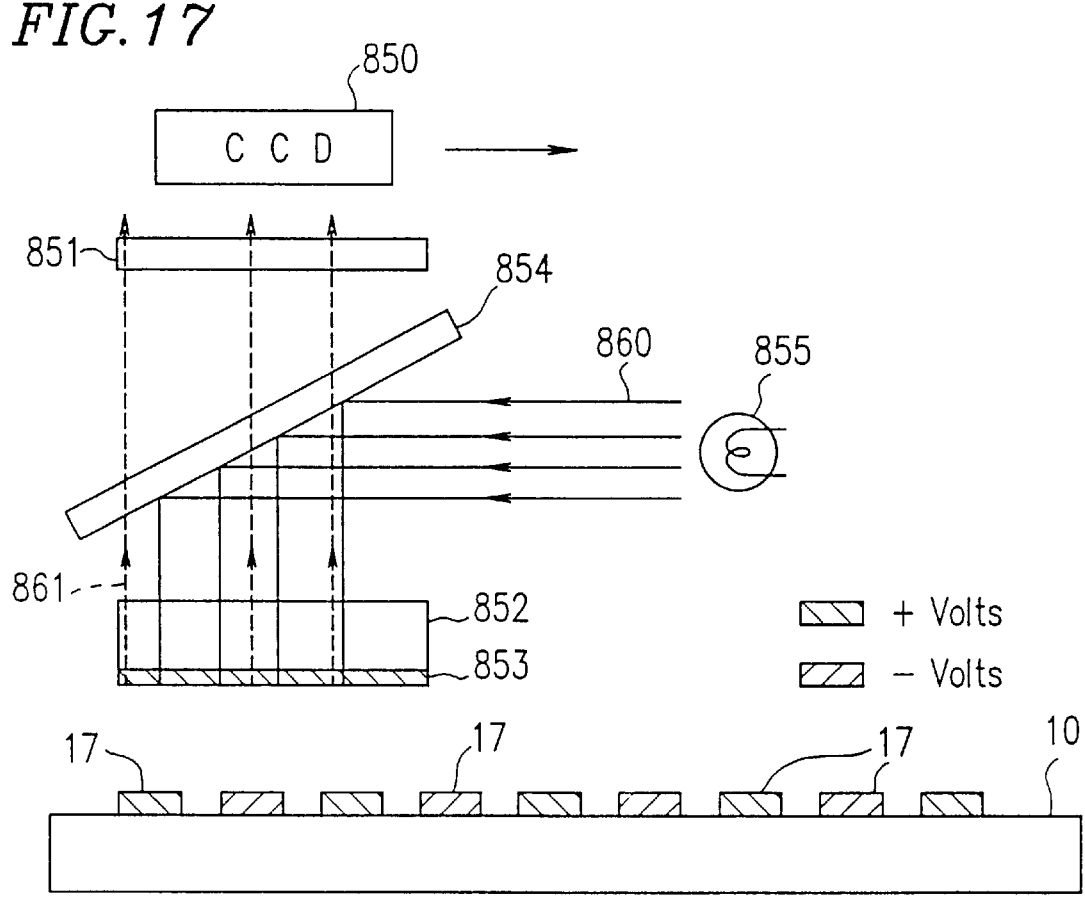
FIG. 17 illustrates an inspection apparatus used for the detection of leakage in the active matrix display device according to the present invention.
Figure 18:
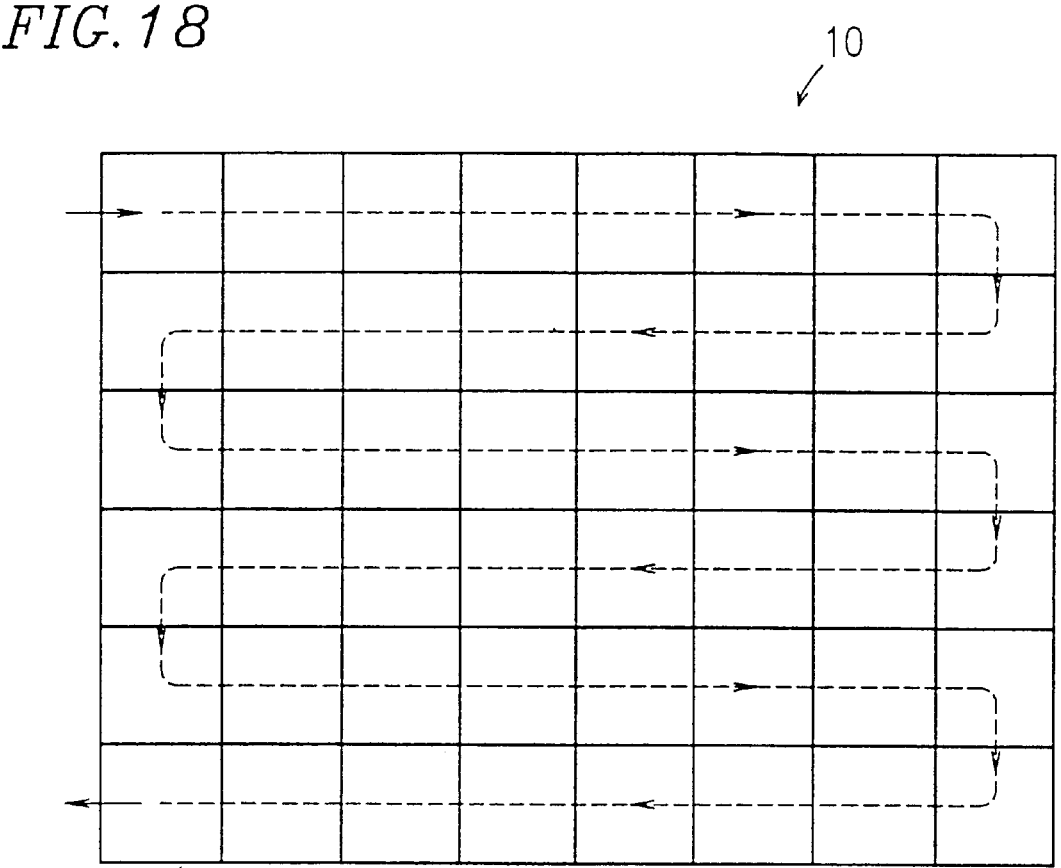
FIG. 18 illustrates a method for inspecting the active matrix display device according to the present invention.

In this example, a method for detecting a defect according to the present invention will be described with reference to FIGS. 17 and 18. In this method, a substrate is inspected at the stage where TFTs have been formed.

First, an active matrix substrate is fabricated as described in Example 1. That is, referring to FIGS. 1 and 2, gate bus lines 11a and 11b made of Ta are formed on a glass substrate 10. A gate insulating film 30 made of $SiN_x$ is then formed over the gate bus lines 11a and 11b. Subsequently, a semiconductor layer 31 made of intrinsic amorphous silicon (a-Si(i)) is formed to a thickness of 1000 Å by plasma CVD in succession with the gate insulating film 30, and patterned. A phosphorus-doped $n^+$-type amorphous silicon layer 32 is then formed to a thickness of 800 Å by plasma CVD and patterned. Then, a source conductive layer made of Ta is formed by sputtering and patterned to form source bus lines 12a and 12b and a source electrode 14 and a drain electrode 15 of a TFT, and an antenna line 17.

Then, the resultant substrate is inspected. The inspection is performed at this early stage of the fabrication process partly because a defect which may be detected at an earlier stage can be repaired more easily and partly because the repair at an earlier stage can minimize the loss. In this example, a voltage image method was employed using an inspection apparatus shown in FIG. 17.

The inspection using this inspection apparatus will be briefly described. First, a signal of a positive or negative voltage (e.g., +20 or −20 V) is input via the source bus line 12a to charge the drain electrode 15 and the antenna line 17. Under this state, light rays 860 (solid-line arrows) are emitted from a lamp 855 to irradiate an optical modulator 852 called a Pockels element via a half-mirror 854. The Pockels element is a special crystal plate of which refractive index changes depending on the ambient electric field strength. Therefore, the polarizing state of reflected light rays 861 (dotted-line arrows) reflected from a reflector 853 changes depending on the surface potential of each pixel. The reflected light rays 861 are subjected to phase removal by a λ/4 plate 851, and then imaged by an imaging device 850 such as a CCD. With this configuration, an imaging signal reflects the surface potential of each pixel. The imaging results are then processed and compared with a reference pattern to determine whether or not an SS leak has occurred. In this inspection apparatus, the TFT substrate 10 is divided into 8×6 sections as shown in FIG. 18, and the above procedure is repeated for each section, thereby to complete the inspection of the entire display device.

A trouble of inferior display caused by the interlayer insulating film 33 sometimes occurs when a material with lower thermal resistance such an acrylic resin is used for the interlayer insulating film 33. This trouble can be prevented by detecting and repairing SS leakage at the above stage.

In the above examples, each of the pixel electrodes is formed on the insulating film which is formed over the source bus line constituting an inverted stagger structure. In the case where the pixel electrode is formed before the formation of the gate bus line, also, the antenna line 17 may be formed in connection with the drain electrode. The point of the present invention is to detect an SS leak by use of an intentionally extended drain electrode for an active matrix display device where an insulating layer is interposed both between the pixel electrode and the gate bus line and between the pixel electrode and the source bus line.

Thus, in the active matrix display device according to the present invention, an extension line from an electrode of each switching element connected to a pixel electrode is formed in the same layer as a signal line so as not to intersect the signal line. With this configuration, in the region where the extension line is formed, the position of a leak between the adjacent signal lines is recognized as a pixel defect, and thus can be easily located.

In the active matrix display device according to the present invention, a connection line connected with each pixel electrode is formed in the same layer as a signal line so as not to intersect the signal line. With this configuration, in the region where the connection line is formed, the position of a leak between the adjacent signal lines is recognized as a pixel defect, and thus can be easily located.

In the defect repair method for an active matrix display device according to the present invention, the position of a leak between adjacent signal lines can be easily located by use of the extension line. This reduces the time required for the repair and is useful in the fabrication process management, thereby greatly contributing to reduce the fabrication cost of the active matrix display device.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An active matrix display device comprising:
   a substrate;
   a scanning line running in a first direction in a first layer above the substrate;
   a signal line running in a second direction in a second layer above the substrate;
   a switching element connected with the scanning line and the signal line;
   an insulating film above the scanning line, the signal line, and the switching element; and
   a pixel electrode above the insulating film and electrically connected with the switching element,
   an extension line connected to an electrode of the switching element, the extension line being formed in the second layer and being isolated from the signal line, said extension line has a connection region and a finger region, where the connection region is connected at least to the switching element, and the finger region extends beyond the connection region and underneath the pixel electrode,
   wherein the finger region of the extension line is electrically isolated from display elements, except through the connection region.

2. An active matrix display device according to claim 1, wherein the connection region of the extension line is connected with the pixel electrode.

3. An active matrix display device according to claim 1, wherein the finger region of the extension line is straight and parallel with the signal line.

4. An active matrix display device according to claim 1, wherein the finger region of the extension line extends to a position near an adjacent scanning line which is not connected with the corresponding switching element.

5. An active matrix display device according to claim 2, further comprising a bus line in the first layer and parallel with the scanning line, wherein a contact hole for connecting the extension line and the pixel electrode is in a region where the connection region of the extension line and the bus line overlap.

6. An active matrix display device according to claim 1, wherein the extension line and the signal line are made of a same material.

7. A defect repair method for an active matrix display, wherein the display includes
   a substrate;
   a scanning line running in a first direction in a first layer above the substrate;
   a signal line running in a second direction in a second layer above the substrate;
   a switching element connected with the scanning line and the signal line;
   an insulating film above the scanning line, the signal line, and the switching element; and
   a pixel electrode above the insulating film and electrically connected with the switching element,
   wherein the active matrix display device further comprises an extension line connected with an electrode of the switching element, the extension line being formed in the second layer so as not to intersect the signal line,
and where the method comprises the steps of:
   applying a current to the signal line, without applying current to the scanning line;
   conducting current from the signal line to the extension line to activate pixel having a point defect, while the switching element is off;
   locating the pixel having the point defect;
   locating a leak position of the pixel having the point defect; and
   eliminating a leak at the leak position.

8. An active matrix display device according to claim 1, wherein the finger region of the extension line is electrically isolated from the display elements, except through the connection region and absent a defective short in the display that connects the finger region to the signal line.

9. An active matrix display device comprising:
   a substrate;
   a scanning line running in a first direction in a first layer above the substrate;
   a signal line running in a second direction in a second layer above the substrate;
   a switching element connected with the scanning line and the signal line;
   an insulating film above the scanning line, the signal line, and the switching element; and
   a pixel electrode above the insulating film and electrically connected with the switching element,
   an extension line connected to an electrode of the switching element, the extension line being formed in the second layer and being isolated from the signal line,
   where said extension line has a connection region and a finger region, where the connection region is connected at least to the switching element and the finger region extends beyond the connection region and underneath the pixel electrode,
   wherein the finger region of the extension line extends to an adjacent scanning line in a non-parallel orientation relative to the first direction.

* * * * *